Dec. 27, 1949  B. F. ARPS  2,492,410
TRACTOR BUMPER
Filed Dec. 6, 1946

INVENTOR.
BRUNO F ARPS
BY
ATTORNEY

Patented Dec. 27, 1949

2,492,410

UNITED STATES PATENT OFFICE 2,492,410

TRACTOR BUMPER

Bruno F. Arps, New Holstein, Wis.

Application December 6, 1946, Serial No. 714,422

4 Claims. (Cl. 280—33.44)

The present invention relates to a novel bumper for the front end of tractors and being arranged to be attached to the front axle, and when desired to be used for a hitch bar connection.

An object of the present invention is to provide a bumper of the character having a grille for protecting the tractor radiator and being designed to improve the appearance of the front end of the tractor.

A further object of the present invention is to provide a projection in the form of a draw bar hitch for pulling or pushing wagons or implements and the like.

Another object of the present invention is to provide a gusset plate which is welded to a portion of the back side of the main frame member of the bumper.

Important objects of the present invention are to provide a bumper which is light, strong and can be manufactured at low cost.

To these and other useful ends my invention consists of parts, combinations of parts or their equivalents as hereinafter described and claimed and shown in the accompanying drawings in which:

Figure 1:
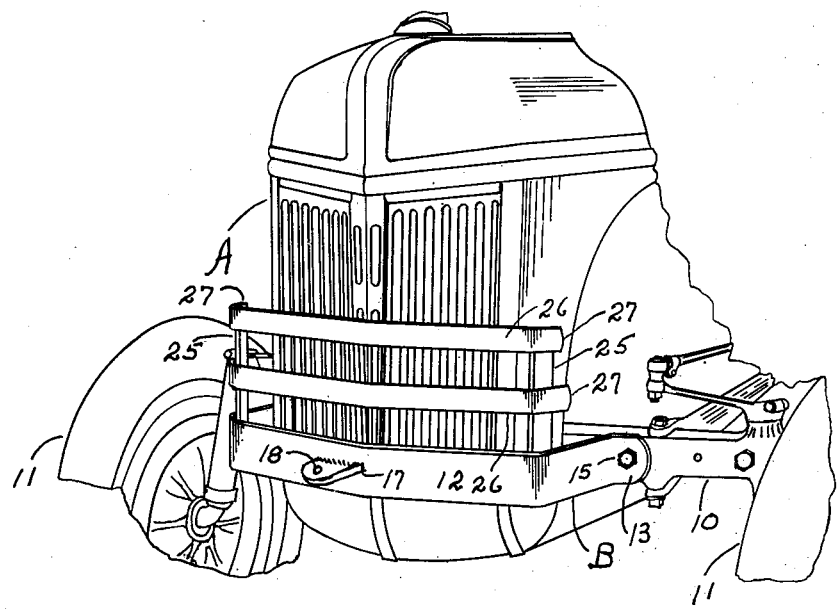
Fig. 1 is a perspective view of a fraction of a tractor illustrating my improved bumper attached thereto.

As thus illustrated the tractor shown is designated by reference character A, and the bumper shown is designated in its entirety by reference character B.

The tractor shown is of a well known design the front axle of which is designated by numeral 10, having rotatably and hingedly mounted on its ends the usual ground wheels 11—11 as is the custom in tractors of the character and wherein the axle is longitudinally hingedly mounted on the tractor frame at its transverse center so the wheels may ride over unequal surfaces independently.

It will be understood, however, that my bumper may be attached to other designs of tractors not having front axles as illustrated. In either event the relative position of the bumper to the radiator, its supports and grilles may be similar to that shown in Figure 1.

Figure 2:
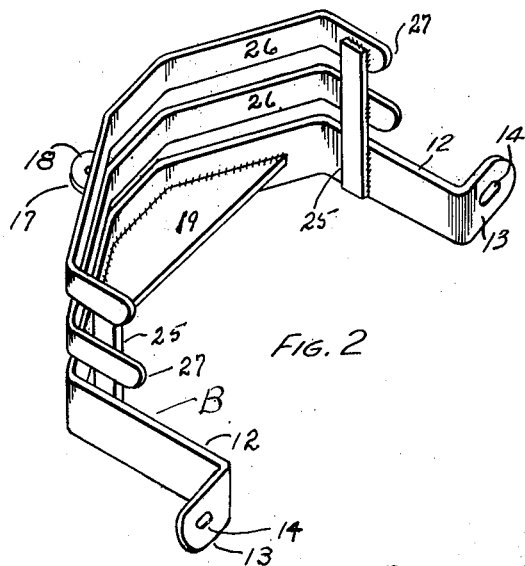
Fig. 2 is an isometric view of the device as shown in Figure 1 and detached from the tractor.

The main frame member of my bumper is designated by reference numeral 12 having a shape as shown in Figures 1 and 2 with out turned flanges 13, each having openings 14 for the reception of bolts 15 which extend through axle 10. Openings 14 may be slightly elongated as shown in Figure 2 for convenience in assembling the bumper to the axle or tractor frame. On the outer transverse center of member 12 I provide a projection 17 having preferably an opening 18 for connection to a hitch bar, rope, or chain. On the rear of the forward portion of member 12 I secure preferably by electric welding a gusset plate 19 for stiffening member 12 which may be subjected to serious strains particularly on member 17.

I provide a grille for member 12 as follows:

Posts 25—25 are preferably electric welded to member 12 about in the position shown and having preferably two substantial grille members 26—26 which are preferably the same shape as the forward end of member 12, their rear ends 27 being electric welded or otherwise secured to posts 25 in the position shown. Thus by the use of six pieces of flat stock and projection 17 I provide a bumper which can be easily attached to a tractor, has a pleasing appearance and being strong enough to protect the vital parts of the tractor against injury.

Thus it will be seen that I have provided a bumper for tractors which accomplishes all of the objects recited in the preamble of this specification. Clearly many minor detailed changes may be made in the design shown without departing from the spirit and scope of the invention as recited in the appended claims.

Having thus shown and described my invention I claim:

1. In a tractor bumper of the character described comprising in combination, a tractor having a front axle, a generally U-shaped frame member the ends of which are bent outwardly forming flanges having means for attachment to the axle in a transversely central position thereof, vertically arranged posts secured to the side members of said U-shaped frame member a distance forward from said flanges, other U-shaped members having a shape substantially similar to the forward portion of said first U-shaped member, their ends being secured to said posts in spaced relation with the U-shaped frame member, thereby forming a grille, an extension secured to the front end of said U-shaped frame member and in the transverse center thereof, and having means to thereby act as an attaching means for a hitch.

2. A device as recited in claim 1 including, a gusset plate permanently secured to the forward portion of said main frame member and on the rearward side and at the transverse center thereof adapted to act as strengthening means.

3. A tractor having a front axle, a bumper comprising a U-shaped main frame member the rear ends of which have outwardly extending flanges with means for attachment to the axle in a transversely central position thereof, vertically arranged posts secured to the sides of said U-shaped member a distance forward of said flanges, other U-shaped members having a shape substantially similar to the forward portion of said U-shaped main frame member with their ends secured to said posts in vertically spaced relation with the main frame member, a projection on the forward end of said first U-shaped member and in the transverse center thereof and having means adapted to act as an attaching means for a hitch member.

4. In a tractor and a bumper therefor, comprising a generally U-shaped member the rear ends of which have outwardly extending flanges with means for removable attachment to the front axle of the tractor and in a transverse central position thereof, posts secured to the sides of said U-shaped member a distance forward of said flanges, other U-shaped members having a shape substantially similar to the forward portion of said first U-shaped member with their ends secured to said posts in vertically spaced relation, a projection on the forward end of said first U-shaped member and in the transverse center thereof and adapted to act as an attaching means for a hitch member.

BRUNO F. ARPS.

REFERENCES CITED

The following references are of record in the file of this patent:

| Number | Name | Date |
| --- | --- | --- |
| 1,483,732 | Klein | Feb. 12, 1924 |
| 1,687,337 | Jaeger | Oct. 9, 1928 |
| 1,692,342 | Miller | Nov. 20, 1928 |
| 2,099,789 | Baker | Nov. 23, 1937 |
| 2,399,810 | Ketcham | May 7, 1946 |